(12) United States Patent
Chang

(10) Patent No.: US 10,084,707 B2
(45) Date of Patent: Sep. 25, 2018

(54) METHODS AND DEVICES FOR SHARING A SERVICE AMONG MULTIPLE DEVICES

(71) Applicant: Mediatek Inc., Hsinchu (TW)

(72) Inventor: Tsu-wu Chang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/148,815

(22) Filed: May 6, 2016

(65) Prior Publication Data

US 2017/0012875 A1    Jan. 12, 2017

Related U.S. Application Data

(60) Provisional application No. 62/189,365, filed on Jul. 7, 2015.

(51) Int. Cl.
*H04L 12/741* (2013.01)
*H04L 29/12* (2006.01)
*H04L 29/08* (2006.01)

(52) U.S. Cl.
CPC ........ *H04L 45/745* (2013.01); *H04L 61/2514* (2013.01); *H04L 67/1095* (2013.01); *H04L 67/16* (2013.01)

(58) Field of Classification Search
CPC ... H04L 45/745; H04L 67/16; H04L 67/1095; H04L 61/2514
See application file for complete search history.

(56) References Cited

U.S. PATENT DOCUMENTS

| 9,203,498 | B2 * | 12/2015 | Ohayon | H04N 21/2187 |
| 2013/0336212 | A1 * | 12/2013 | Kim | H04W 4/003 370/328 |
| 2015/0156122 | A1 * | 6/2015 | Singh | H04L 47/20 370/235 |
| 2015/0201090 | A1 * | 7/2015 | Nerst | G06Q 30/06 455/407 |

(Continued)

OTHER PUBLICATIONS

Duc Hoang Bui et al., "GreenBag: Energy-efficient Bandwidth Aggregation for Real-time Streaming in Heterogeneous Mobile Wireless Networks", Department of Computer Science at KAIST, Dept. of ECE, Duke Univ., USA, Software R&D Center Samsung Electronics, South Korea (2011-2012).

(Continued)

*Primary Examiner* — Brian D Nguyen
(74) *Attorney, Agent, or Firm* — Oblon, McClelland, Maier & Neustadt, L.L.P.

(57) ABSTRACT

Methods and devices for sharing services among multiple devices are provided. The methods and devices may involve multiple devices and a service-sharing platform that allows multiple different services available on the multiple devices to be shared among the multiple devices. One device may lack a service and request that service from one or more other devices that have the service. The methods and devices may further involve an iptables-based routing technique to connect or transmit data from one device to one or more other devices. The technique may comprise marking communications of one device based on a marking feature of iptables and creating a rule for the marked communications. The rule may instruct the marked communications to look up a routing table and to be routed to a default route of the routing table.

15 Claims, 7 Drawing Sheets

(56) References Cited

U.S. PATENT DOCUMENTS

| | | | | |
|---|---|---|---|---|
| 2015/0229713 A1* | 8/2015 | Lu | ........................ | H04W 4/003 |
| | | | | 709/203 |
| 2015/0278678 A1* | 10/2015 | Sharma | .................. | G06N 3/006 |
| | | | | 706/11 |
| 2016/0173297 A1* | 6/2016 | Kanugovi | ........... | H04L 12/4633 |
| | | | | 370/328 |
| 2016/0381536 A1* | 12/2016 | Li | .......................... | H04L 67/24 |
| | | | | 455/41.1 |

OTHER PUBLICATIONS

U.S. Appl. No. 14/943,363, filed Nov. 17, 2015.
U.S. Appl. No. 62/114,252, filed Feb. 10, 2015.

* cited by examiner

METHODS AND DEVICES FOR SHARING A SERVICE AMONG MULTIPLE DEVICES

CROSS-REFERENCE TO RELATED APPLICATIONS

This application claims the benefit of U.S. Provisional Application No. 62/189,365, filed Jul. 7, 2015. This application is also related to U.S. non-provisional application Ser. No. 14/943,363, filed Nov. 17, 2015, which claims the benefit of U.S. Provisional Application No. 62/114,252, filed Feb. 10, 2015. The contents of each application are incorporated herein by reference thereto.

FIELD OF THE INVENTION

The present invention relates to methods and devices for sharing a service among multiple devices, more particularly to such methods and devices allowing one of the multiple devices to request Internet service from or to provide Internet service to another one of the multiple devices.

BACKGROUND OF THE INVENTION

Computing devices, such as desktop computers, laptop computers, tablets, smartphones, personal digital assistants (PDA), wearable devices, internet of things (IOT) devices, and the like, have generally been provided as integrated electronics and circuits of standalone devices. For example, computing devices may have included power, processing, storage, display, input capabilities, and output capabilities all in the same computing device. Thus, historically, there has been no need to share functionality across devices when an integrated set of functionality is already available within a single device.

Wireless communication technology (e.g., Bluetooth, Ultra-wideband (UWB), WiMax, Long Term Evolution (LTE), 4G systems) are becoming more powerful such that individuals rely on the Internet in their day-to-day life for a wide range of services. Each device may operate independently of one another based on a set of network services from a network provider. However, when a device becomes disconnected from a network provider for any reason, or even the device is not equipped with ability to connect to the Internet, the user of the device is left with little recourse for continuing to receive voice or data by the device.

Moreover, with the enhancement in computing power and improvement in functionality, computing devices nowadays have expanded in features to take upon multiple roles beyond their traditional uses. For instance, our smartphones have become our digital cameras and video recorders, and in some cases replaced or used in lieu of computers. Our tablets have now replaced some uses of computers, and our mobile devices such as laptops or mobile phones now drive or are used to control home video/audio systems. Therefore, as the number of features increases, so does the desire to share those features with other device.

SUMMARY OF THE INVENTION

In one embodiment of the present invention, a method for sharing a service among multiple devices is contemplated. The method may comprise finding, by a first device, the service available from a second device, wherein the service is an Internet service, and requesting, by the first device, to share access to the Internet service. The method may also comprise receiving registration information of the second device from a platform and wherein the first device is connected with the second device to establish an Internet connection for the first device, the Internet connection for the first device is established by relaying packets from the first device to the second device and transmitting the relayed packets from the second device to Internet through network address translation and/or reverse network address translation.

In one variation, the method may further comprise joining a service-sharing platform allowing multiple different services available on multiple devices in a local area network to be shared among the multiple devices, wherein the services available on the multiple devices are shared among the multiple devices through a network that is part of the platform. The method may further comprise syncing, as part of an operation of the platform, the first device with the platform to search and request services registered on the platform. The method may further comprise searching, by the first device, on the platform for the Internet service.

In one variation, the method may further comprise receiving registration information for a third device on the platform and the first device is connected with the third device to share at the same time Internet service with the second device and the third device. The method may further comprising creating one routing table corresponding to the second device and the other routing table corresponding to the third device, setting default route of the one routing table to an IP address of the second device, and setting default route of the other routing table to an IP address of the third device. The method may further comprise marking communications of the first device. The method may further comprise creating a rule for the marked communications. The rule may instruct the marked communications to look up one of the routing tables and to be routed to the set default route of the routing table. The Internet connection for the first device may be further established by relaying packets from the first device to the second device and the third device and transmitting the relayed packets from the second device and the third device to Internet through reverse network address translation.

In one variation, the method may further comprise searching, by the first device, on the platform for the Internet service. The platform may be a service-sharing platform allowing the service available on one device to be shared with another device. The service-sharing platform may also allow multiple services available on the multiple devices to be shared among the multiple devices. The first device may be synced with the platform to search and request a service registered on the platform and the second device may be synced with the platform to share a service.

In another embodiment of the present invention, a first device capable of sharing access to a service available from a second device is contemplated. The first device may be configured to find the service available from the second device, wherein the service is an Internet service, and request to share access to the Internet service. The first device may also be configured to receive registration information of the second device from a platform and wherein the first device is connected with the second device to establish an Internet connection for the first device, the Internet connection for the first device is established by relaying packets from the first device to the second device and transmitting the relayed packets from the second device to Internet through network address translation and/or reverse network address translation.

In one variation, the first device may be configured to include applications that rely on communications over the Internet to provide services to the first device. The first device may also be configured to join a local area network and participate in a service-sharing platform allowing multiple different services available on multiple devices in the local area network to be shared among the multiple devices. The services available on the multiple devices may be shared among the multiple devices through a network that is part of the platform. The first device may be further configured to sync, as part of an operation of the platform, with the platform to search and request services registered on the platform. The first device may be further configured to search on the platform for the Internet service.

In one variation, the first device may be further configured to receive registration information for a third device on the platform and the first device is connected with the third device to share at the same time Internet service with the second device and the third device. The first device is further configured to create one routing table corresponding to the second device and the other routing table corresponding to the third device, set default route of the one routing table to an IP address of the second device, and set default route of the other routing table to an IP address of the third device. The first device may be further configured to mark communications of the first device. The first device may be further configured to create a rule for the marked communications. The rule may instruct the marked communications to look up one of the routing tables and to be routed to the set default route of the routing table. The Internet connection for the first device may be further established by relaying packets from the first device to the second device and the third device and transmitting the relayed packets from the second device and the third device to Internet through reverse network address translation.

In one variation, the first device may be further configured to search on the platform for the Internet service. The platform may be a service-sharing platform allowing the service available on one device to be shared with another device. The service-sharing platform may also allow multiple services available on the multiple devices to be shared among the multiple devices. The first device may be synced with the platform to search and request a service registered on the platform and the second device may be synced with the platform to share a service.

In yet another embodiment of the present invention, a non-transitory computer readable storage medium configured to store computer instructions is contemplated. The medium, when executed, may cause a processor of a first device to find the service available from the second device, wherein the service is an Internet service and request to share access to the Internet service. The medium, when executed, may also cause the processor to receive registration information of the second device from a platform and wherein the first device is connected with the second device to establish an Internet connection for the first device, the Internet connection for the first device is established by relaying packets from the first device to the second device and transmitting the relayed packets from the second device to Internet through network address translation and/or reverse network address translation.

In one variation, the medium, when executed, may further cause the processor to join a local area network and participate in a service-sharing platform allowing multiple different services available on multiple devices in the local area network to be shared among the multiple devices. The services available on the multiple devices may be shared among the multiple devices through a network that is part of the platform. The medium, when executed, may further cause the processor to sync, as part of an operation of the platform, the first device with the platform to search and request services registered on the platform. The medium, when executed, may further cause the processor to search on the platform for Internet service and find the Internet service. The second device may be synced to with the platform. In addition, the medium, when executed, may further cause the processor to share access to the Internet service.

In response to requesting, the medium may further cause the processor to receive registration information of the second device from the platform and connect the first device with the second device through the network to establish an Internet connection for the first device. The Internet connection for the first device may be established by relaying packets from the first device to the second device through the network and transmitting the relayed packets from the second device to Internet through network address translation implemented on the second device.

In one variation, the medium, when executed, may further cause the processor to receive registration information for a third device on the platform and the first device may be connected with the third device to share at the same time Internet service with the second device and the third device.

In yet another embodiment of the present invention, a method for sharing services among multiple devices is contemplated. The method may comprise joining a service-sharing platform allowing multiple different services available on multiple devices in a local area network to be shared among the multiple devices. The services available on the multiple devices may be shared among the multiple devices through a network that is part of the platform. The method may also comprise syncing, as part of an operation of the platform, a first client device with the platform to search and request services registered on the platform. The method may further comprise searching, by the first client device, on the platform for Internet service and finding an Internet service registered on the platform to be available from a second client device that is synced with the platform to share services. In addition, the method may comprise requesting, by the first client device, to share access to the registered Internet service.

In response to requesting, the method may receive registration information of the second client device from the platform and connecting the first client device with the second client device through the network to establish an Internet connection for the first client device. The Internet connection for the first client device may be established by relaying packets from the first client device to the second client device through the network and transmitting the relayed packets from the second client device to Internet through network address translation implemented on the second client device.

In one variation, the method may comprise, in response to requesting, receiving registration information for additional client devices on the platform and connecting the first client device with the additional client devices to share at the same time Internet service with the second client device and the additional client devices. The method may also comprise creating a number of routing tables corresponding to the number of the second client device and the additional client devices and setting default route of each routing table to an IP address of one of the second client device and the additional client devices. The set default route of each routing table may be different.

In one variation, the method may comprise marking communications of the first client device. The method may also comprise creating a rule for the marked communications. The rule may instruct the marked communications to look up one of the routing tables and to be routed to the set default route of the routing table. The method may further comprise relaying packets from the first client device to the second client device and the additional client devices and transmitting the relayed packets from the second client device and the additional client devices to Internet through reverse network address translation.

In yet another embodiment of the present invention, a first client device that is capable of sharing services among multiple devices is contemplated. The first client device may comprise an electronic device configured to include applications that rely on communications over the Internet to provide services to the electronic device. The electronic device may be configured to join a local area network and participate in a service-sharing platform allowing multiple different services available on multiple devices in the local area network to be shared among the multiple devices. The services available on the multiple devices may be shared among the multiple devices through a network that is part of the platform. The electronic device may also be configured to sync, as part of an operation of the platform, with the platform to search and request services registered on the platform. The electronic device may further be configured to search on the platform for Internet service and find an Internet service registered on the platform to be available from a second client device that is synced with the platform to share services. In addition, the electronic device may be configured to request to share access to the registered Internet service.

In response to requesting, the electronic device may be configured to receive registration information of the second client device from the platform and connecting the electronic device with the second client device through the network to establish an Internet connection for the electronic device. The Internet connection for the electronic device may be established by relaying packets from the electronic device to the second client device through the network and transmitting the relayed packets from the second client device to Internet through network address translation implemented on the second client device.

In yet another embodiment of the present invention, a non-transitory computer readable storage medium configured to store computer instructions is contemplated. The medium, when executed, may cause a processor of a first client device to join a local area network and participate in a service-sharing platform allowing multiple different services available on multiple devices in the local area network to be shared among the multiple devices. The services available on the multiple devices may be shared among the multiple devices through a network that is part of the platform. The medium, when executed, may also cause the processor to sync, as part of an operation of the platform, with the platform to search and request services registered on the platform. The medium, when executed, may further cause the processor to search on the platform for Internet service and find an Internet service registered on the platform to be available from a second client device that is synced with the platform to share services. In addition, the medium, when executed, may cause the processor to request to share access to the registered Internet service.

In response to requesting, the medium may cause the processor to receive registration information of the second client device from the platform and connecting the electronic device with the second client device through the network to establish an Internet connection for the electronic device. The Internet connection for the electronic device may be established by relaying packets from the electronic device to the second client device through the network and transmitting the relayed packets from the second client device to Internet through network address translation implemented on the second client device.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION OF THE INVENTION

The embodiments of the present invention relate to methods and devices for sharing services among multiple devices. The methods and devices may involve multiple devices and a service-sharing platform that allows multiple different services available on the multiple devices to be shared among the multiple devices. In one embodiment, the services may be shared through a network that is part of the platform. The services may include an Internet service and other services available on the devices such as camera, speaker, controller, software etc. The services may be provided by hardware, software or a combination thereof. Each device may share one or more services.

A device may lack a service and request that service from one or more other devices that have the service. For example, a device without Internet access or a camera may request an Internet service or image recording service from one or more other devices that have Internet access or a camera. The device may also request access to a service even when it already has the service available so as to strengthen its functionalities. For example, a device having Internet access or a camera may request Internet service or image recording service from one or more other devices that have Internet access or a camera to increase its Internet speed or take a picture with higher quality (or a picture from a different perspective). In one embodiment, the multiple devices and the services available on the multiple devices may be synced with and registered in the platform in manners allowing each device to communicate with other devices through the platform. Communicating may refer to searching, requesting, receiving services or information from the other devices, and/or connecting to the other devices that enable the device to utilize services shared by the other devices.

The methods and devices may further involve an iptables-based routing technique to connect or transmit data from one device to other devices. The technique may comprise marking communications of the one device and creating a rule for the marked communications based on iptables technology. The rule may instruct the marked communications to look up a routing table and to be routed to a default route of the routing table or one of the other devices.

These and other features and advantages of the present invention will become more apparent and appreciated from the following detailed description of embodiments of the present invention.

Figure 1:
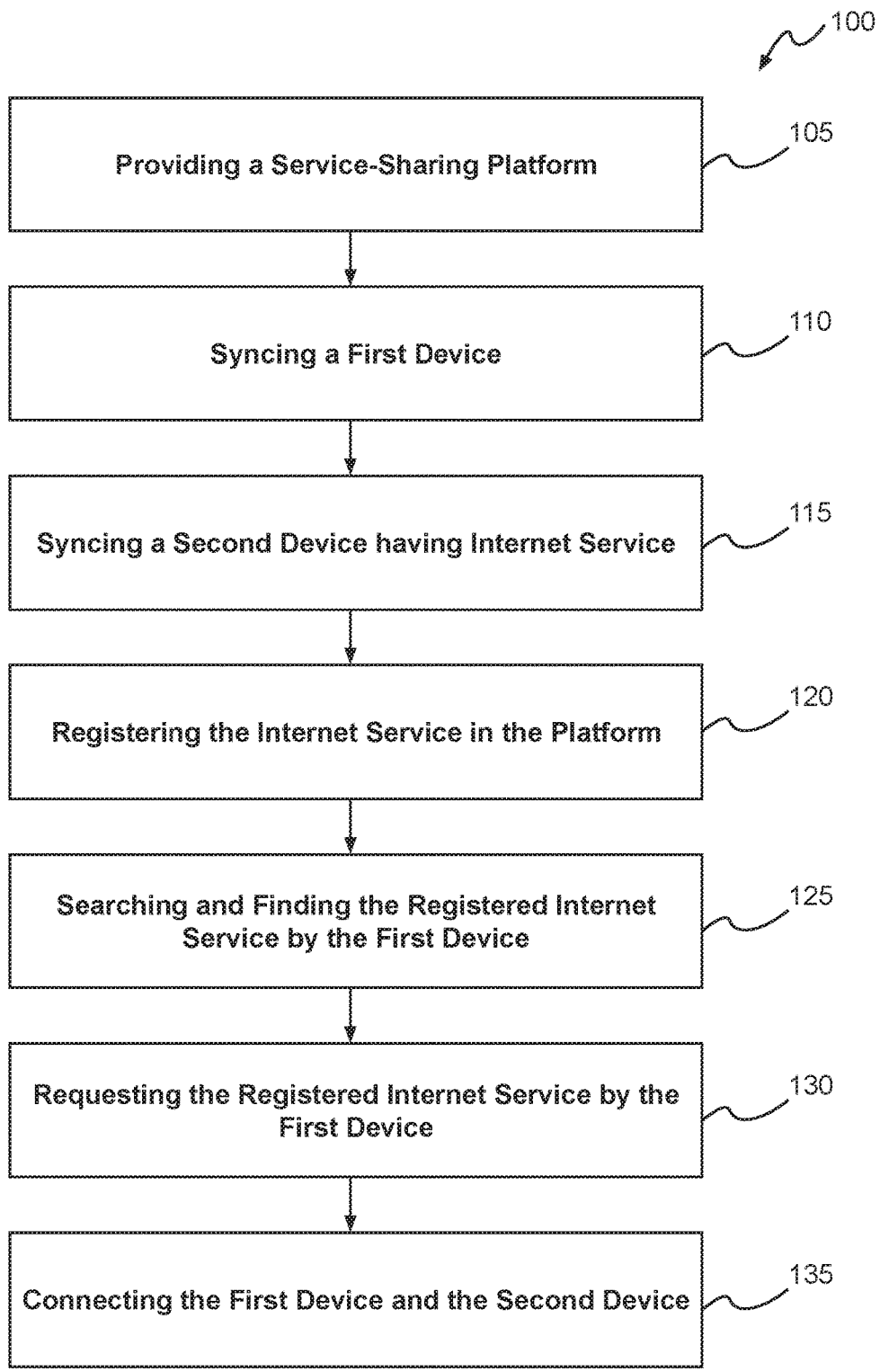
FIG. 1 depicts an illustrative method for sharing a service among multiple devices in accordance with some embodiments of the present invention.

Referring to FIG. 1, one embodiment of the method 100 for sharing a service among multiple devices is illustrated. In this embodiment, the method 100 may be designed for allowing a first device to access the Internet via an Internet service shared by a second device. The method 100 may comprise providing a service-sharing platform 105. The service-sharing platform may allow multiple different services available on multiple devices to be shared among the multiple devices. The services available on the multiple devices may be shared among the multiple devices through a network that is part of the platform. In one embodiment, the multiple devices may be in a local area network. A first device and a second device may join the service-sharing platform. The method 100 may further comprise syncing the first device with the platform 110, and syncing the second device having Internet service with the platform 115. The step of syncing may be a part of an operation of the platform. The first device may be synced with the platform to search and request services registered on the platform. The second device may be synced with the platform to share services. The method 100 may further comprise registering the Internet service in the platform as a service that is available to be shared with other devices on the platform 120, searching and finding the registered Internet service on the platform by the first device 125, requesting the registered Internet service by the first device 130, and connecting the first device and the second device 135. The step of requesting the registered Internet service may include requesting to share access to the registered Internet service. In one embodiment, the first device may receive registration information of the second device from the platform. The step of connecting the first device with the second device may include connecting the first device with the second device to establish an Internet connection for the first device. In one embodiment, the Internet connection may be established through the network. In one embodiment, the Internet connection for the first device may be established by relaying packets from the first device to the second device through the network and transmitting the relayed packets from the second device to Internet through network address translation (NAT). The network address translation may be implemented on the second device. In one embodiment, the Internet connection for the first device may be established by relaying packets from the first device to the second device and transmitting the relayed packets from the second device to Internet through reverse network address translation.

Figure 2:
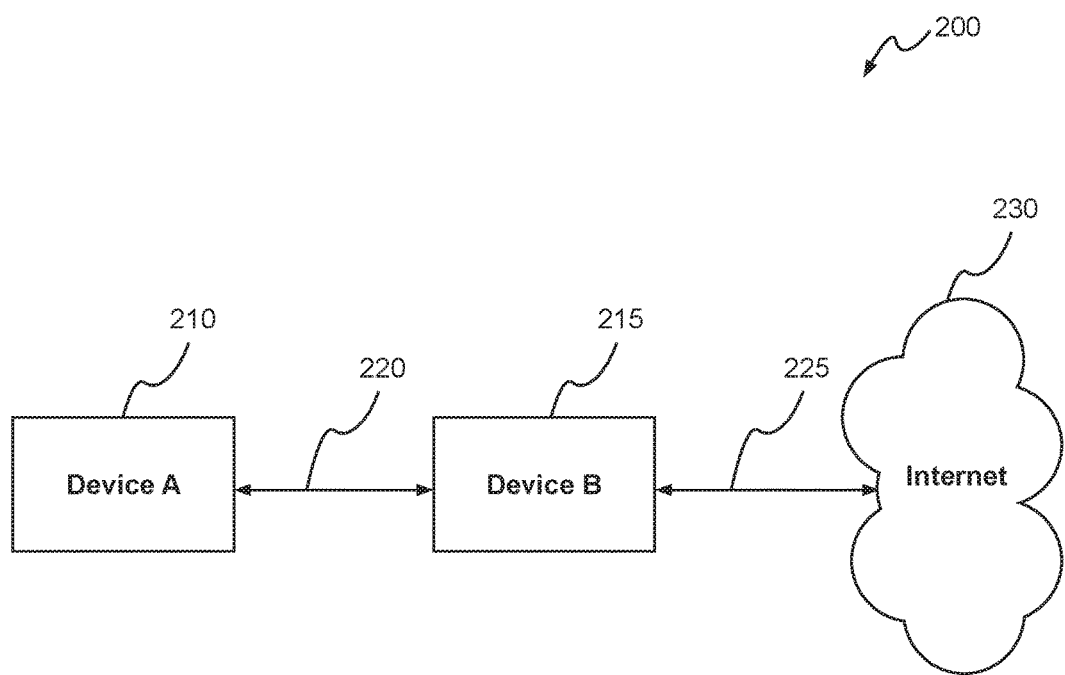
FIG. 2 depicts an illustrative system including devices for sharing service among multiple devices in accordance with some embodiments of the present invention.

FIG. 2 is an illustrative system 200 including devices for performing the method disclosed in FIG. 1. The system 200 may comprise a hardware module, a software module or a combination thereof configured to provide a service-sharing platform, a first device (e.g. Device A 210) synced to the platform, and a second device (e.g. Device B 215) having Internet service synced to the platform. In one embodiment, the platform can be a software service programmed or implemented on devices. The platform can be implemented on device(s) that locate whether another device(s) on a local network also has that capability. The operation of the platform can be centered or controlled by one device or distributed among the devices on the local network. A registry that saves resource registration may be saved on the platform such as by saving the information on one or more devices or saving on memory that is accessible to one or more devices. The discussion below for this embodiment may refer to one or both of the figures.

In the step of providing a service-sharing platform 105, the platform may be one allowing multiple different services available on multiple devices to be shared among the multiple devices. The services available on the multiple devices may include hardware and software services. Hardware services may refer to services provided by hardware of the multiple devices and software services may refer to services provided by software of the multiple devices. The multiple devices may connect to each other through Bluetooth, Wi-Fi, Ethernet or any other wireless or wired connection. Examples of devices include, but not limited, desktop computers, laptop computers, tablets, smartphones, personal digital assistants (PDA), smart televisions, gaming systems, wearable devices, IOT devices and similar devices. The multiple devices may include Device A 210 and Device B 215 as shown in FIG. 2. This embodiment (and the embodiments below) may be directed to the multiple devices in a local area network (LAN). The local area network may be a wireless local area network (WLAN).

The platform may also comprise or provide a connecting network through which the services available on the multiple devices can be shared among the multiple devices. The connecting network may be created once the multiple devices are synced with the platform. The connecting network may permit the multiple devices to be connected or communicate with each other in order to share their available services. The connecting network may enable the multiple devices to directly communicate with each other through Bluetooth, Wi-Fi, Ethernet or any other wireless or wired connection, to communicate with each other through the platform, or both. In this embodiment, the Device A 210 and Device B 215 communicate with each other through a Wi-Fi network 220. Examples of the Wi-Fi network 220 include, but not limited to, Wi-Fi Direct network, Peer-to-Peer network, ad hoc network, WLAN, or other network without an infrastructure mode. In one embodiment, the connecting network is configured to provide direct communications between the multiple devices through a Wi-Fi network. In implementation of some embodiments of the present invention, the multiple devices, the local area network, and the connecting network may not include or involve an access point (e.g., router) or a server. It is contemplated that a local area network that includes such devices may also include an access point or router and that the devices can communicate directly with each other with the involvement of the access point or router if desired. In some embodiments, the access point or router provides for initial communications between the devices that establish a direct (peer-to-peer) connection (e.g., a wireless connection) without the involvement of an access point or router once the connection is established.

An example of the platform comprising or providing the aforementioned features is CrossMount developed by MediaTek, Inc. Other hardware and/or software resource pairing, mounting, converging, and/or sharing technology may also be employed as long as that technology can configured to include the aforementioned features. The platform may be Windows, OS, Android, iOS, or Linux-based. The connecting network or the Wi-Fi network aspect of the platform may be implemented with the particular protocols adopted by that particular technology such as Universal Plug and Play (UPnP) protocols.

In the step of syncing the first device with the platform 110, the first device may be one of the multiple devices. The first device may communicate with the second device or other devices on the platform once the first device is synced. For example, the first device may be Device A 210 in FIG. 2 having only a Wi-Fi network interface configured to support the Wi-Fi network 220 and to communicate with the second device (e.g. Device B 215) via the Wi-Fi network 220. The first device may also be known as the requestor or the service-requesting device.

In the step of syncing a second device having Internet service 115, the second device having Internet service is also one of the multiple devices. The second device with Internet service may be a device capable of communicating to equipment (e.g., servers) on the Internet via its hardware, software, or both. The second device may have a communication range defined by a mobile telecommunications technology or a communication range longer than that of the first device. The second device may also communicate with the first device or other devices on the platform once the second device is synced. For example, the second device may be Device B 215 in FIG. 2 having both a Wi-Fi network interface configured to support the Wi-Fi network 220 and to communicate with the first device (e.g. Device A 210) via the Wi-Fi network 220 and a mobile interface configured to support a mobile telecommunications technology 225 (such as Long Term Evolution (4G LTE) or other generation of mobile telecommunications technology) and to communicate with Internet 230 (e.g., Internet applications or services available by communicating packets with devices available on the Internet). The second device may communicate with the Internet through mobile interface, Ethernet or any other wireless or wired connection. The second device may also be known as the provider or the service-providing device.

The interface between requester and provider may be referred to as the downstream interface and the interface between the provider and the Internet may be referred to as the upstream interface. The second device (the provider in this embodiment) may also adopt multi-SIM technology to have two or more upstream interfaces.

In one embodiment, the syncing process in either step 110 or 115 may refer to a process that allows the first device, the second device, or other device to record its device and network information in the platform and join the platform in order to be live on the platform. For example, device information may include device identification number, hardware and software of the device and services capable being provided by those hardware and software, and other similar device information. Hardware and software of the device, for example, may include a mobile interface and its transmitting speed and range, a camera and its resolution, a speaker and its sound effect, an image editing software, an audio editing software, etc. Capable services of the hardware and software may be the Internet connectivity provided by the mobile interface, image recording function provided by the camera, sound playing function provided by the speaker, image editing function provide by the image editing software, audio editing function provided by the audio editing software etc. For example, the network information may include network address and the manner in which the device syncs with or provides its device and network information to the platform (e.g., whether the network path between the device and platform involves an access point or router), and other similar network information.

Although the device may record its device and network information in the platform and join the platform in order to be live, in one embodiment, its capable services may not be available to other devices on the platform or may not be available on the platform to be shared with or discovered by other devices on the platform until those services are registered in the platform. In one embodiment, the syncing process may be a process between the device to be synced and the platform only, without involving other devices on the platform. The device may record its device and network information in a memory that is inaccessible by other devices on the platform. Devices on the platform may refer to devices that are already synced with the platform, one embodiment, after syncing or while live, the device then may register its capable services on the platform or search or request services registered on the platform.

In one embodiment, the syncing process may also involve a procedure that keeps the status of devices up to date. The procedure may comprise periodically checking status or asking devices to confirm status. The status may include most recent device and network information of current devices (those already synced to the platform before any of them departs from the platform or before any additional device syncs to the platform), whether one or more of current devices have left the platform and most recent device and network information of remaining devices, whether one or more additional devices have joined the platform and device and network information of the joined one or more additional devices, and most recent device and network information of the joined one or more additional devices.

In the step of registering the Internet service in the platform as a service that is available to be shared with other devices on the platform 120, the registering step may be a process of saving or moving the Internet service into another memory or a registry that is accessible by the first device or other devices on the platform. As such, the Internet service can be found by and shared with those devices. Other capable services of the second device (e.g. Device B 215) may also be registered in the platform as available services. Information associated with these services may also be registered, such as type of service, service description, number of services, communication port on the device for each service, etc. Registered available services and associated information may be referred to as registration information. The registration step may be performed by the second device (e.g. Device B 215) to register one, some, or all capable services of the second device or by the user of the second device to select only services he or she wishes to share with other devices.

In some embodiments, the syncing and registering steps of the second device (e.g. Device B 215) may be one single step. For example, the syncing step may comprise registering the Internet service or other service and the registering step may comprise syncing the second device. In some embodiments, the syncing and register steps may be part of an operation of the platform. In some embodiments, the syncing and register steps may be part of an operation of the second device (e.g. Device B 215).

Subsequent to the registering step, the first device may search on the platform for Internet service and find the registered Internet service (step 125 in FIG. 1). The first device then may request the registered Internet service from the platform or the second device (step 130) and be connected to the second device (step 135). The request and the connection may be performed via the connecting network of the platform or the Wi-Fi network 220 in FIG. 2. The connection (step 135) may establish an Internet connection for the first device as shown in FIG. 2 by relaying packets from the first device (e.g. Device A 210) to the second device (e.g. Device B 215) through the connecting network or the Wi-Fi network 220 and transmitting the relayed packets from the second device (e.g. Device B 215) to Internet 230 through network address translation (NAT) and/or reverse NAT. In one embodiment, while being connected (step 135), the first device (e.g. Device A 210) may act as a client device and the second device (e.g. Device B 215) may serve as a hotspot or a Wi-Fi hotspot device.

In some embodiments, a distinction over prior art system in which a device can join a Wi-Fi hotspot to receive Internet access is that in such systems there is no resource sharing platform that, for example, would provide for resource sharing and the ability to search in the platform to find an Internet service that is currently available. After the Internet connection is established, the first device can access Internet if it is a device without Internet access or can have faster Internet speed if it is a device already has Internet access.

Although the method 100 is described from both the first device and the second device's perspectives, a person with ordinary skill in the art would understand that the method 100 may also be described from either the first device's perspective or the second device's perspective based on the disclosure above.

Figure 3:
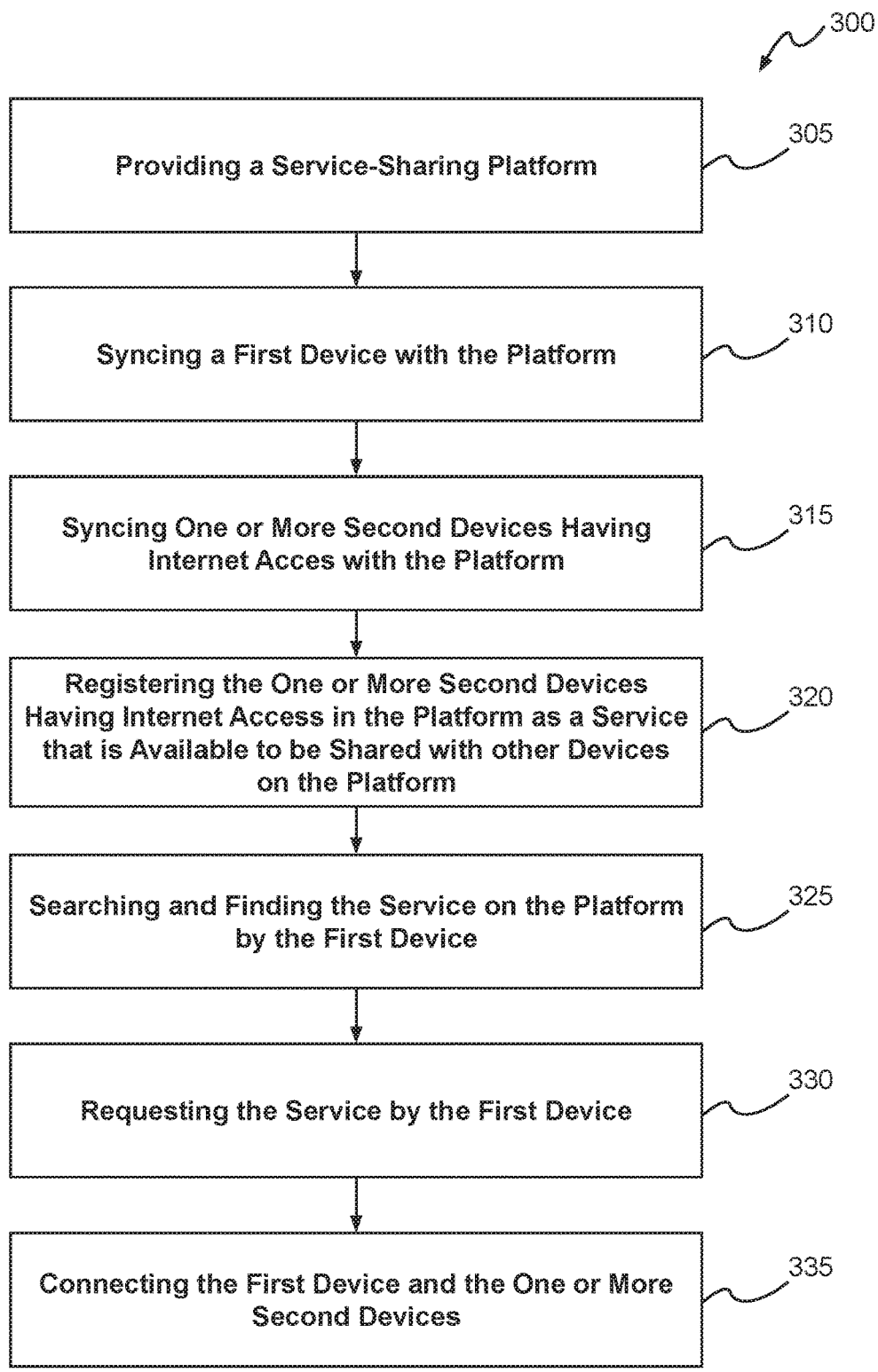
FIG. 3 depicts another illustrative method for sharing a service among multiple devices in accordance with some embodiments of the present invention.

Referring to FIG. 3, another embodiment of the method 300 for sharing services among multiple devices is illustrated. The features and functions of this embodiment may be similar to the embodiments discussed above. Similar terms and usage may have similar meanings. The method 300 may comprise providing a service-sharing platform 305. The service-sharing platform may allow multiple different services available on multiple devices to be shared among the multiple devices. The services available on the multiple devices may be shared among the multiple devices through a network that is part of the platform. In one embodiment, the multiple devices may be in a local area network. A first device and one or more second devices may join the service-sharing platform. The method 300 may further comprise syncing the first device with the platform 310, and syncing one or more second devices having Internet access with the platform 315. The step of syncing may be a part of an operation of the platform. The first device may be synced with the platform to search and request services registered on the platform. The one or more second devices may be synced with the platform to share services. The method 300 may further comprise registering the one or more second devices' Internet access in the platform as a service that is available to be shared with other devices on the platform 320, searching and finding the service on the platform by the first device 325, requesting the service by the first device 330, and connecting the first device and the one or more second devices 335. The step of requesting the registered Internet service may include requesting to share access to the registered Internet service. In one embodiment, the first device may receive registration information of the one or more second devices from the platform. The step of connecting the first device with the one or more second devices may include connecting the first device with the one or more second devices to establish an Internet connection for the first device. In one embodiment, the Internet connection may be established through the network. In one embodiment, the Internet connection for the first device may be established by relaying packets from the first device to the one or more second devices through the network and transmitting the relayed packets from the one or more second devices to Internet through network address translation (NAT). The network address translation may be implemented on the one or more second devices. In one embodiment, the Internet connection for the first device may be established by relaying packets from the first device to the one or more second devices and transmitting the relayed packets from the one or more second devices to Internet through reverse network address translation. The established Internet connection may enable the first device to access Internet when the first device is a device without Internet access or may increase the Internet bandwidth of the first device when the first device is a device that already has Internet access.

Figure 4A:
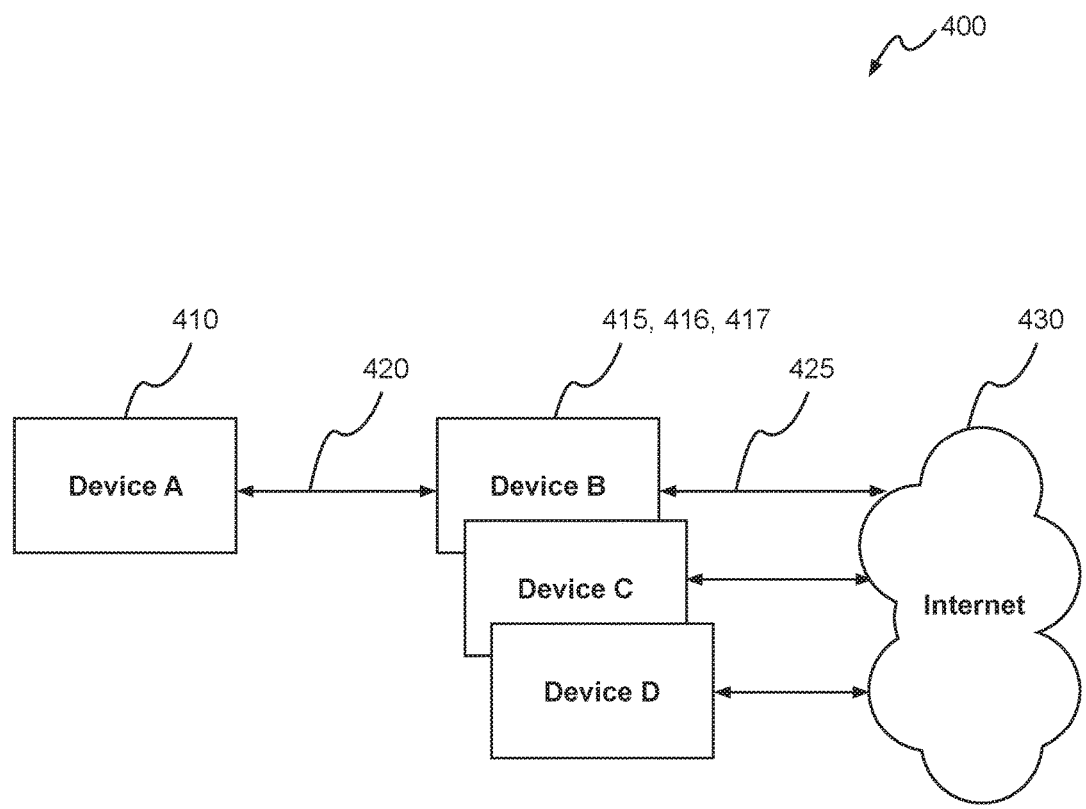
FIGS. 4A and 4B depict another illustrative system including devices for sharing service among multiple devices in accordance with some embodiments of the present invention.
Figure 4B:
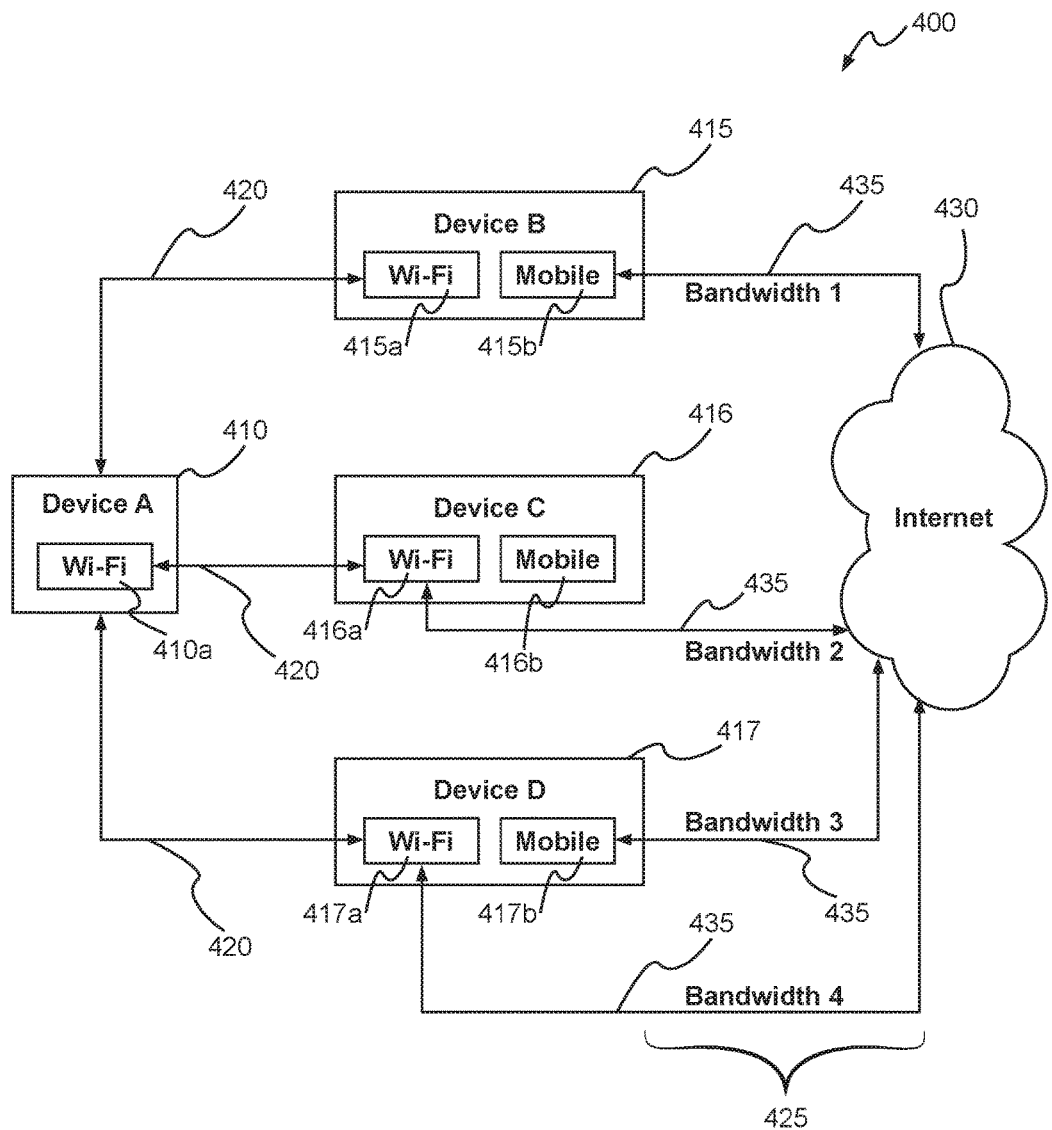

FIGS. 4A and 4B are illustrative systems 400 including devices for performing the method disclosed in FIG. 3. The system 400 may comprise a hardware module, a software module or a combination thereof configured to provide a service-sharing platform, a first device (e.g. Device A 410) synced to the platform, and one or more second devices (e.g. Device B 415, Device C 416, Device D 417) synced to the platform. The features and functions of this embodiment may be similar to the embodiment discussed above except those described below.

The first device may be a device that can communicate with the one or more second devices. For example, the first device may be Device A 410 in FIG. 4B having a Wi-Fi network interface 410a configured to support the Wi-Fi network 420 and to communicate with the one or more second devices (e.g. Device B 415, Device C 416, Device D 417) via the Wi-Fi network 420. Although the first device in FIGS. 4A and 4B communicates with the one or more second devices via the Wi-Fi network 420, it is for illustration only, but not a limitation. The first device may communicate with the one or more second devices via any wireless or wired connection.

The one or more second devices may be devices that can communicate with the first device and have an Internet service connection. For example, the one or more second devices may be Devices B, C, and D 415, 416, 417 in FIG. 4B having a Wi-Fi network interface 415a, 416a, 417a configured to support the Wi-Fi network 420 and to communicate with the first device (e.g. Device A 410) via the Wi-Fi network 420 and a mobile interface 415b, 416b, 417b configured to support at least one mobile telecommunications technology 425 and to communicate with Internet 430. Each of the one or more second devices (e.g. Device B 415, Device C 416, and Device D 417) may communicate with Internet 430 at an Internet bandwidth 435.

Referring to FIG. 4A, the one or more second devices' (e.g. Device B 415, Device C 416, Device 417) Internet capability may be registered in the platform as a service that is available to be shared with other devices on the platform. Once registered, the first device (e.g. Device A 410) may search and find that service on the platform. Searching and finding the registered service may be performed by the first device. Upon finding the registered service, the first device may request the registered service from the platform or the one or more second devices and be connected to the one or more second devices. The request and the connection may be performed via the connecting network of the platform or the Wi-Fi network 420. The connection may establish an Internet connection for the first device by relaying packets from the first device to the one or more second device through the connecting network or the Wi-Fi network 420 and transmitting the relayed packets from the one or more second devices to Internet 430 through reverse network address translation (reverse-NAT). In one embodiment, while being connected, the first device may serve as a hotspot or a Wi-Fi hotspot device and the one or more second devices may act as client devices.

The established Internet connection may enable the first device to access Internet when the first device is a device without Internet access or may increase the Internet bandwidth of the first device when the first device is a device that already has Internet access. When the first device is a device that already has Internet access, the first device (e.g. Device A 410) may access Internet with more bandwidth since there may be more second devices (e.g. Device B 415, Device C 416, Device D 417) providing Internet service.

FIG. 4B illustrates an example connection allowing the first device (e.g. Device A 410) to gain Internet access when the first device is without Internet access or to obtain more bandwidth when the first device already has Internet access. The first device and the one or more of the second devices (e.g. Device B 415, Device C 416, and Device D 417) may communicate with each other via their corresponding Wi-Fi network interfaces or through the Wi-Fi network 420. Each of the one or more of the second devices may have its mobile interface (e.g., 415*b*) communicating with equipment (e.g., servers) on Internet 430, its Wi-Fi network interface (e.g., 416*a*) communicating with equipment on Internet 430 in addition to communicating with the first device (e.g. Device A 410), or both of its mobile interface (e.g., 417*a*) and Wi-Fi network interface (e.g., 417*b*) communicating with equipment on Internet 430. The Wi-Fi network interface of the one or more second devices may obtain Internet service through one or more intermediary devices that have Internet access. The one or more intermediary devices may be client devices or non-client devices such as routers. The Wi-Fi network interface and the mobile interface of the one or more second devices may communicate with Internet at a bandwidth 435. The bandwidth of each second device or network interface may be the same or different. When the first device is a device without Internet access, it may be configured without a mobile interface. When the first device is a device that already has Internet access, it may be configured with a mobile interface.

When the first device and the one or more of the second devices are connected, the first device may route one or more of its communications to the one or more of the second devices through an iptables-based mechanism. The first device (e.g. the service requestor) may create a number of routing tables and the number of routing tables may correspond to the number of the one or more of the second devices (e.g. the service providers). The first device may obtain the IP address of each of the one or more of the second devices via the service-sharing platform or other connections, and set the default route of each routing table to one of the obtained IP addresses. The set default route of each routing table may be different. The iptables-based mechanism may be implemented on the first device and allows the first device to mark each of its communications prior to routing each communication. Marking may be provided by the CONNMARK feature of iptables. This feature may mark each of its communications with a mark and the mark may be associated with a connection. For example, the mark may be a number such as 0x10, 0x1.1, 0x5A, 0x5B, 0x100, 0x200, and so forth. 0x10 may be tied to connection A, 0x11 may be tied to connection B, and so forth. Connection may refer to the connection between the first device and one of the second or more devices. For example, connection A may refer to the connection between the first device and the second device, connection B may refer to the connection between the first device and the third device, and so forth. The first device may create Internet Protocol (IP) rule(s) to tie a mark to a connection. The IP rules(s) may instruct at least one of the marked communications to look up one of the routing tables and be routed to the set default route of that routing table. The IP rule(s) may be created before or after marking. The IP rule(s) may determine the specific routing table that a marked communication should look up. In other words, the IP rule(s) may determine where a marked communication should be routed to. In some embodiments, the mark may be applied to each individual packet in the communication to instruct each packet to look up one of the routing tables and be routed to the set default route of that routing table. Communication may refer to a group of packets or an individual packet.

The one or more of the second devices may also have their own routing table(s). The one or more of the second devices may receive communications from the service requestor or an equipment on the Internet. The routing table(s) may determine where the received communications come from and govern where the received communications should be transmitted. When the communications are received from the service requestor, the routing table(s) may determine which service requestor is requesting a service and which equipment on the Internet (or which destination address) the received communications should be transmitted to. When the communications are received from an equipment on the Internet, the routing table(s) may determine which equipment is sending the communications and which service requestor the received communications should be transmitted to.

Figure 5:
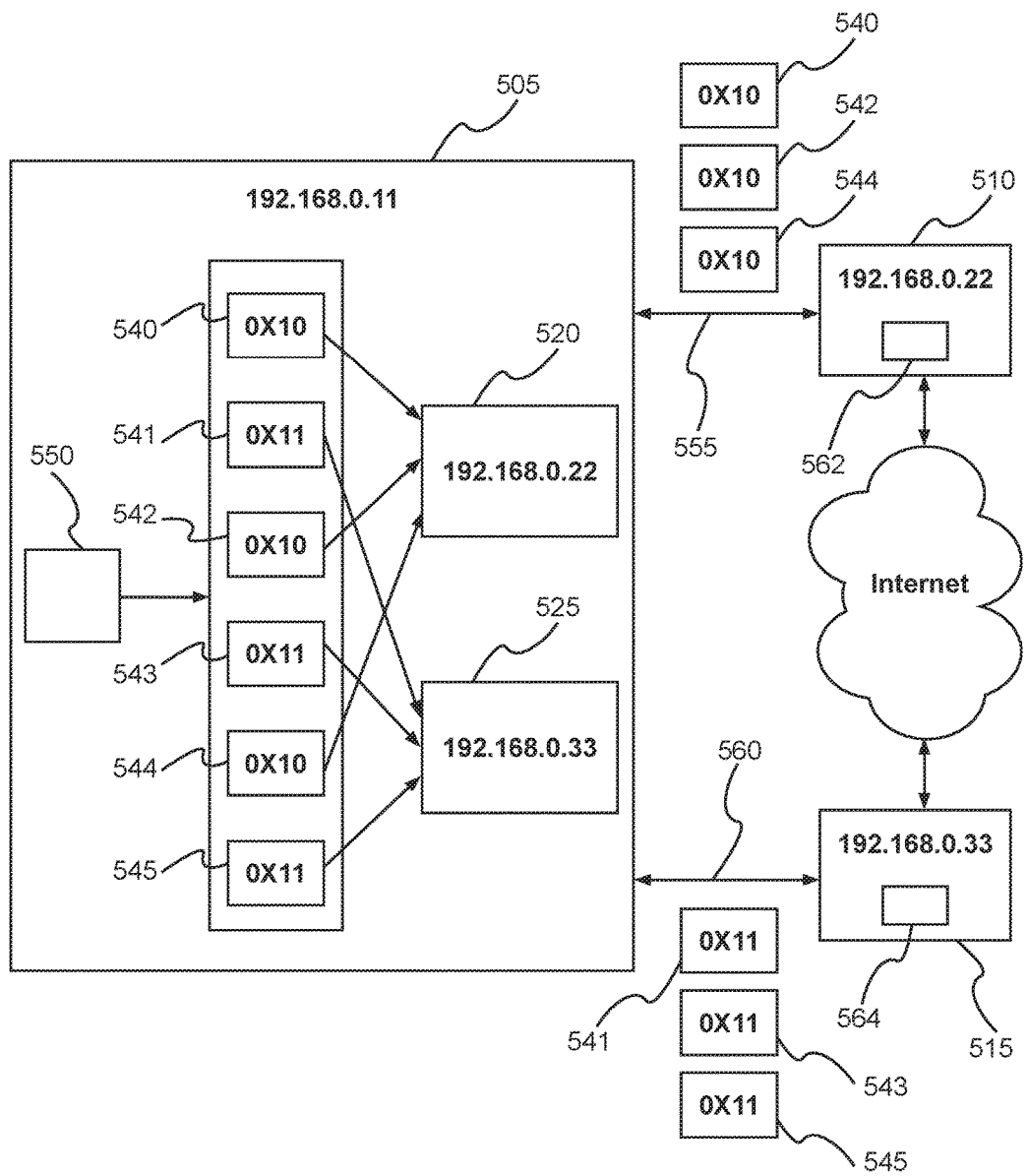
FIG. 5 depicts an illustrative routing method in accordance with some embodiments of the present invention.

FIG. 5 is an illustration of such routing. In a network such as a local area network, there may be a first device 505 (e.g. service requester) with an IP address of 192.168.0.11, a second device 510 (e.g. service provider) with an IP address of 192.168.0.22, and a third device 515 (e.g. service provider) with an IP address of 192.168.0.33. Devices 505, 510, and 515 may be part of a local area network over which they can communicate using a LAN protocol and local addressing. The first device 505 may create two routing tables 520, 525 and set the default route of one routing table, e.g., 520, to 192.168.0.22 and the default route of another routing table, e.g., 525, to 192.168.0.33. Through the iptables-based mechanism, the first device 505 may mark each of its communications 540-545 with a number such as 0x10 or 0x11. Therefore, some communications may be marked with 0x10 and some communications (or the remaining communications) may be marked with 0x11. In some embodiments, the communications 540-545 are TCP connections. The first device 505 may further create an IP rule 550 instructing communications marked with 0x10 to look up routing table 520 and communications marked with 0x11 to look up routing table 525 and be routed to the associated devices 510 or 515. In some embodiments, each of the communications 540-545 may include a group of packets. In some embodiments, each of the communications 540-545 may be an individual packet. The iptables-based mechanism may be a subsystem built into an operating system or a hardware module configured to instruct the first device 505 as described. The connection between the first device 505 and the second device 510 may be a first channel 555 and the connection between the first device 505 and the third device 515 may be a second channel 560.

In some embodiments, the communications of the first device may refer to TCP connections creating from the first device. In this situation, the first device may similarly mark each TCP connection and create IP rules to route each marked TCP connection to a corresponding second device (e.g. the service provider) through the iptables-based mechanism.

The second and third devices 510, 515 may have their own routing table(s) 562, 564. From the received communications 540, 542, 544 and 541, 543, 545, the second and third devices 510, 515 may determine through their routing table(s) 562, 564 that the first device 505 is requesting a service. The second and third devices 510, 515 may also determine through their routing table(s) which equipment on the Internet the received communications 540, 542, 544 and 541, 543, 545 should be transmitted to. The second and third devices 510, 515 may make similar determinations when an equipment on the Internet sends communications to each of the second and third devices 510, 515. The second and third devices 510, 515 may determine through their routing table(s) which equipment on the Internet is sending the communications. The second and third devices 510, 515 may also determine through their routing table(s) which requestor device the received communications should be transmitted to. The second and third devices 510, 515 should have their secure network address translation (SNAT) function enabled, including IP forwarding, to transmit packets to the upstream interface. In some embodiments, the first device 505 (e.g. the service requester) may further monitor the throughput of one or more of the second and the third devices 510, 515 (e.g. the service providers) and may assign more TCP connections to a device that has better bandwidth and/or higher throughput. In some embodiments, one or both of the second and the third devices 510, 515 may include multiple SIM cards or virtual SIMs, therefore one or both of the second and third devices 510, 515 (e.g. the service provider) may transmit received packets through two or more upstream interfaces to provide additional bandwidth to the first device 505 (e.g. the service requester).

In FIGS. 4A, 4B, and 5, the Internet service of each second device (e.g. the Device B 415, Device C 416, Device D 417 in FIGS. 4A and 4B, and the second and third devices 510 and 515) may be simultaneously shared with the first device. Such sharing may allow the second devices to concurrently or collectively provide an Internet connection to the first device to enable the first device to access Internet when it is a device without Internet access or with a bandwidth larger than the bandwidth of the Internet service of the first device when it is a device that already has Internet access. For example, whether the first device transmits data to or receives data from equipment on the Internet, some of the data may be directed to one of the second devices, some of the data may be directed to another one of the second devices, in this way, the second devices may together transmit all the data (instead of utilizing only one second device to transmit all the data) to the first device or equipment on the Internet. In some embodiments, the Internet bandwidth of each second device may be larger than that of the first device. In some embodiments, the combined Internet bandwidth of some or all of the second devices may be larger than that of the first device. Each second device may transmit the same or different amount of data to the first device or equipment on the Internet. A second device with an Internet bandwidth larger than that of another second device may transmit more data. Moreover, since FIGS. 4A, 4B, and 5 involve more than one second device, the term "one or more second devices" mentioned in the corresponding discussions may be two or more second devices.

Although the method 300 is described from both the first device and the one or more second devices' perspectives, a person with ordinary skill in the art would understand that the method 300 may also be described from either the first device's perspective or the one or more second devices' perspective based on the disclosure above.

Figure 6:
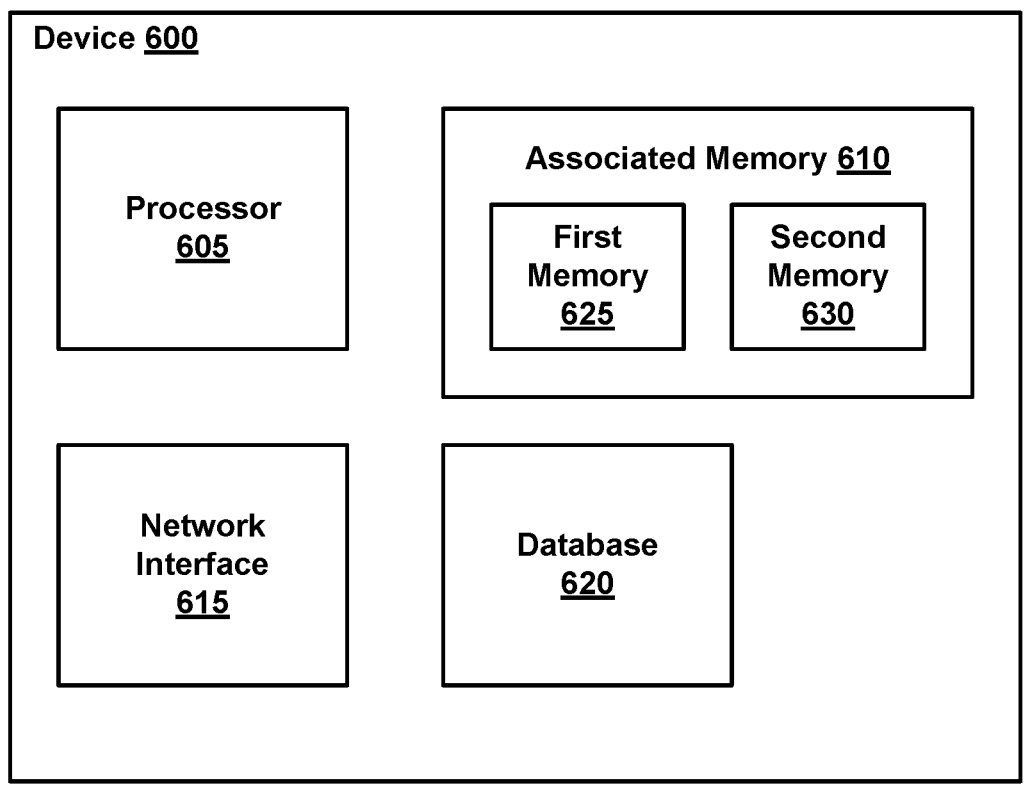
FIG. 6 depicts an illustrate device in accordance with some embodiments of the present invention.

Referring to FIG. 6, one embodiment of the device 600 is illustrated. The device 600 may be a first device, a second device, or other device. The device 600 may comprise a processor 605, associated memory 610, and a network interface 615. The associated memory 610 may be configured to store computer instructions that when executed causes the processor 605 to perform the processes, steps, or other features described above and to store device and network information of the device 600, status of the device 600 and other devices on the platform, registered services and information associated with those services, and/or other information described above. The processor 605 may be an application-specific integrated circuit (ASIC) or other type of integrated circuit. The associated memory 610 may also store routing tables and IP rules. The associated memory 610 may be one single memory or multiple memories with each memory storing specific instructions and/or information. For example, the associated memory 610 may comprise a first memory 625 configured to store device and network information and be inaccessible by other devices on the platform and a second memory 630 configured to store registered services and be accessible by other devices on the platform. The network interface 615 may be a Wi-Fi network interface configured to support a Wi-Fi network, a mobile interface configured to support a mobile telecommunications technology (such as Long Term Evolution (4G LTE) or other generation of mobile telecommunications technology), or a combination of both the Wi-Fi network interface and the mobile interface. The network interface 615 may further have the necessary software to support its respective network and perform its respective network communication. The network interface 615 may also be a communication port.

The device 600 may also have a database 620, which if desired, can be implemented in the second memory 630, in which tags may be stored which may publicize the registered services for other devices on the platform or make the registered services discoverable by other devices on the platform. These tags may identify the registered services of the device 600. The database 620, in this example, is in the device 600 but in other examples, it can be implemented in another device for providing this service to other devices or it can be implemented in multiple devices on a network that cooperatively implement the database and platform. These tags may enable the other devices on the platform to read or search through these tags and request the registered services once the search results return a match between the registered services and the requested services. Upon request, the device 600 may access and/or activate the requested services on the device 600 and provide the use of the requested services to the other devices (the requesting devices) on the platform. The device 600 would provide the necessary access to provide for the use of the registered services by the requesting devices.

In any of the above embodiments, the first device may be a device without Internet access. A device without Internet access may be a device that relies on Internet connection to run software and/or hardware services but is currently without access. A device without Internet access may also be a device without the hardware and/or software necessary to gain Internet access, a device having the hardware and/or software necessary to gain Internet access but with the hardware and/or software turned off, a device having the hardware and/or software necessary to gain Internet access but incapable of gaining Internet access. A device without Internet access may have only a communication range defined by a LAN. In this instance, the first device may gain Internet access via Internet service shared by the second device or more devices. The first device may gain Internet access through embodiments disclosed in FIGS. 1-2 or FIGS. 3-5.

The first device may also be a device that already has Internet access. The first device may have a mobile interface configured to support at least one mobile telecommunications technology and to communicate with Internet. The first device may communicate with Internet at a first bandwidth. In this instance, the Internet bandwidth (first bandwidth) of the first device may be increased through embodiments disclosed in FIGS. 1-2 or FIGS. 3-5. The second or more devices may have an Internet bandwidth (second bandwidth) that is larger than the first bandwidth, and their bandwidth may be shared with the first device. The term "bandwidth" may refer to the maximum bandwidth that the device can reach in at least one mobile telecommunications technology employed by the device. For example, if the device adopted a mobile telecommunications technology such as 3G, then bandwidth may refer to the maximum bandwidth that can be achieved by 3G. In some embodiments, bandwidth may refer to a suboptimal bandwidth, e.g., 2G, below the maximum bandwidth because of poor reception or other signal issues.

In one scenario, the second bandwidth may be larger than the first bandwidth because the second or more devices are configured with a more advanced mobile telecommunications technology compared to the first device, e.g., 4G vs. 3G, and both the first device and the second or more devices are operating at their maximum bandwidth provided by their respective technology. In another scenario, the second bandwidth may be larger than the first bandwidth when the first device and the second or more devices are configured with the same mobile telecommunications technology, e.g., 4G vs. 4G. This situation may occur when the first device has poor reception and can operate only at 3G even though it is capable of operating at 4G while the second or more devices can operate at their maximum bandwidth provided by 4G. The first device may search and find the second and more devices in either scenario.

It should be noted that the Internet service in the embodiments above is only an example of the service to be shared rather than a limitation. According to embodiments of the present invention, any capability of a device can be a service to be shared. Besides, in some embodiments, one or more of the second devices (e.g. the service provider) may include multiple SIM cards or virtual SIMs, therefore the one or more of the second devices may transmit received packets through two or more upstream interfaces to provide additional bandwidth to the first device (e.g., the service requester).

It should be understood that there can be devices on the local network that will be able to communicate on the network but may not be part of the platform. Those devices will not be provided access to the resources of the platform and the information (e.g., registered services) stored on the platform would not be accessible to such devices that are compatible with the network but are not compatible with the platform.

The hardware module configured to provide service-sharing platform discussed in this disclosure may refer to one or more of the above components. The hardware module for the iptables-based mechanism discussed in this disclosure may also refer to one or more of the above components.

The platform may be implemented on all devices in the local area network so they could search their own memory that supports the platform. All the devices may have hardware and software to join and use it. In some embodiments, the platform may be implemented on one or more devices. The platform is capable of selecting one or more devices and managing the Internet connection in either situation.

In some embodiments, Internet connection, Internet service, or Internet access may refer to the ability to have an Internet connection that allows the device to connect to the Internet and communicate with equipment and other devices that are available on the Internet. The connection may involve DNS services/servers or other type of name services/servers.

To clarify, the present description sometimes describes the operation of the systems, devices, method, or computer-readable medium by providing a description of the operation or structure from the user's perspective. It should be understood to describe the systems, devices, method, or medium.

It is understood from the above description that the functionality and features of the systems, devices, or methods of embodiments of the present invention include generating and sending signals to accomplish the actions.

It should be understood that variations, clarifications, or modifications are contemplated. Applications of the technology to other fields are also contemplated.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods (or sequence of device connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention.

It should be understood that combinations of described features or steps are contemplated even if they are not described directly together or not in the same context.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A method for sharing a service among multiple devices comprising:

finding, by a first device, the service available from a second device, wherein the service is an Internet service;

requesting, by the first device, to share access to the Internet service;

receiving registration information of the second device from a platform and wherein the first device is connected with the second device to establish an Internet connection for the first device, the Internet connection for the first device is established by relaying packets from the first device to the second device and transmitting the relayed packets from the second device to Internet through network address translation or reverse network address translation;

receiving registration information for a third device on the platform and the first device is connected with the third device to share at the same time Internet service with the second device and the third device; and creating a first routing table corresponding to the second device and a second routing table corresponding to the third device, setting default route of the first routing table to an IP address of the second device, and setting default route of the second routing table to an IP address of the third device.

2. The method according to claim 1, further comprising marking communications of the first device.

3. The method according to claim 2, further comprising creating a rule for the marked communications.

4. The method according to claim 3, wherein the rule instructs the marked communications to look up one of the first and second routing tables and to be routed to the set default route of the one of the first and second routing tables.

5. The method according to claim 4, wherein the Internet connection for the first device is further established by relaying packets from the first device to the second device and the third device and transmitting the relayed packets from the second device and the third device to Internet through reverse network address translation.

6. The method according to claim 1, further comprising:

searching, by the first device, on the platform for the Internet service, wherein the platform is a service-sharing platform allowing the service available on one device to be shared with another device.

7. The method according to claim 6, wherein the service-sharing platform allows multiple services available on the multiple devices to be shared among the multiple devices, the first device is synced with the platform to search and request a service registered on the platform and the second device is synced with the platform to share a service.

8. A first device capable of sharing access to a service available from a second device, wherein the first device is configured to:

find the service available from the second device, wherein the service is an Internet service;

request to share access to the Internet service;

receive registration information of the second device from a platform and wherein the first device is connected with the second device to establish an Internet connection for the first device, the Internet connection for the first device is established by relaying packets from the first device to the second device and transmitting the relayed packets from the second device to Internet through network address translation or reverse network address translation;

receive registration information for a third device on the platform and the first device is connected with the third device to share at the same time Internet service with the second device and the third device; and create a first routing table corresponding to the second device and a second routing table corresponding to the third device, setting default route of the first routing table to an IP address of the second device, and setting default route of the second routing table to an IP address of the third device.

9. The first device according to claim 8, wherein the first device is further configured to mark communications of the first device.

10. The first device according to claim 9, wherein the first device is further configured to create a rule for the marked communications.

11. The first device according to claim 10, wherein the rule instructs the marked communications to look up one of the first and second routing tables and to be routed to the set default route of the one of the first and second routing tables.

12. The first device according to claim 11, wherein the Internet connection for the first device is further established by relaying packets from the first device to the second device and the third device and transmitting the relayed packets from the second device and the third device to Internet through reverse network address translation.

13. The first device according to claim 8, wherein the first device is further configured to:

search on the platform for the Internet service, wherein the platform is a service-sharing platform allowing the service available on one device to be shared with another device.

14. The first device according to claim 13, wherein the service-sharing platform allows multiple services available on the multiple devices to be shared among the multiple devices, the first device is synced with the platform to search and request a service registered on the platform and the second device is synced with the platform to share a service.

15. A non-transitory computer-readable storage medium configured to store computer instructions that when executed by one or more processors of a first device, cause the one or more processors to:

find a service available from a second device, wherein the service is an Internet service;

request to share access to the Internet service;

receive registration information of the second device from a platform and wherein the first device is connected with the second device to establish an Internet connection for the first device, the Internet connection for the first device is established by relaying packets from the first device to the second device and transmitting the relayed packets from the second device to Internet through network address translation or reverse network address translation;

receive registration information for a third device on the platform and the first device is connected with the third device to share at the same time Internet service with the second device and the third device; and create a first routing table corresponding to the second device and a second routing table corresponding to the third device, setting default route of the first routing table to an IP address of the second device, and setting default route of the second routing table to an IP address of the third device.

* * * * *